United States Patent
Beiter

[11] Patent Number: 5,876,158
[45] Date of Patent: Mar. 2, 1999

[54] DRIVE COLLET ASSEMBLY FOR A TAP WITH OVERDRIVE PROTECTION

[76] Inventor: Russell R. Beiter, 25755 Stizerville Rd., Cochranton, Pa. 16314

[21] Appl. No.: 984,441

[22] Filed: Dec. 3, 1997

[51] Int. Cl.$^6$ .............................. B23B 31/38; B23G 5/16
[52] U.S. Cl. ........................ 408/139; 81/477; 192/55.1; 279/83; 279/157; 408/222; 408/239 R; 464/37; 470/103
[58] Field of Search ...................... 279/157, 83; 470/96, 470/102, 103, 198; 408/238, 239 R, 240, 139, 140, 222; 81/477; 192/55.1, 56.1; 464/37; 403/DIG. 3

[56] References Cited

U.S. PATENT DOCUMENTS

| | | |
|---|---|---|
| 1,290,427 | 1/1919 | Velk . |
| 1,826,107 | 3/1931 | Woods ................................... 192/55.1 |
| 2,784,429 | 3/1957 | Jones ......................................... 10/129 |
| 2,791,433 | 5/1957 | Dodd ....................................... 408/139 |
| 2,974,965 | 3/1961 | Welles, Jr. ................................. 279/83 |
| 3,142,077 | 7/1964 | Nickell ..................................... 10/129 |
| 3,162,283 | 12/1964 | Saul et al. ................................. 192/34 |
| 3,299,697 | 1/1967 | Sparling ..................................... 73/104 |
| 3,466,681 | 9/1969 | Benjamin et al. ......................... 10/141 |
| 4,081,873 | 4/1978 | Lemanski ................................. 10/89 H |
| 4,115,025 | 9/1978 | Petroff ......................................... 408/6 |
| 4,174,918 | 11/1979 | Tanaka ..................................... 408/139 |
| 4,304,511 | 12/1981 | Machida ..................................... 408/11 |
| 4,364,694 | 12/1982 | Miles ....................................... 408/129 |
| 4,386,689 | 6/1983 | Kato ...................................... 192/56 R |
| 4,507,025 | 3/1985 | Fedor ......................................... 408/6 |
| 4,547,105 | 10/1985 | Höfle et al. .............................. 408/141 |
| 4,664,571 | 5/1987 | Takada et al. ........................... 409/134 |
| 4,692,072 | 9/1987 | Pfister et al. ............................ 408/124 |
| 4,694,686 | 9/1987 | Fildes et al. ............................... 73/104 |
| 4,944,643 | 7/1990 | Lehmkuhl ................................. 409/80 |
| 5,096,343 | 3/1992 | Luu ......................................... 408/134 |
| 5,131,794 | 7/1992 | Johnson ................................. 408/139 |
| 5,155,473 | 10/1992 | Oketani et al. ......................... 340/680 |
| 5,248,229 | 9/1993 | Bilz ........................................... 408/16 |
| 5,351,039 | 9/1994 | Oketani et al. ......................... 340/680 |
| 5,643,089 | 7/1997 | Hummel ................................... 464/37 |

*Primary Examiner*—Steven C. Bishop
*Attorney, Agent, or Firm*—Richard K. Thomson

[57] ABSTRACT

A drive collet assembly for an internal thread producing tap. The collet includes a collar that is attached to the stem of the tap using set screws. The collar is received into a recess of the body portion of a drive collet and retained therein using a spring clip. A smaller diameter aperture extends into the body portion above the recess, the aperture receiving a portion of the stem of the tap, the portion has a pair of opposed flats thereon. At least two laterally extending threaded apertures intersect the smaller diameter aperture and each receive a rigid button, a flexible element and a set screw. The set screw can be adjusted to provide a desired breakaway torque which will protect the tap from breakage should an over-torque condition occur. The flexible element will allow the rigid buttons to be forced outwardly so that the drive collet assembly spins freely about the jammed tap, rather than twisting it off. Reversing the direction of the drive will break off the chip or burr or clear the tip of the tap from touching the bottom of the hole and allow the tap to be rotated out of the hole.

13 Claims, 2 Drawing Sheets

DRIVE COLLET ASSEMBLY FOR A TAP WITH OVERDRIVE PROTECTION

The present invention is directed to a collet for driving an internal thread producing tap. More particularly, the present invention is directed to a drive collet for a tap that has overdrive protection in order to avoid breaking the tap.

Taps for use in producing internal threads are relatively expensive. Further, such taps are subject to breakage should they be over-torqued as a result of buildup of resistance to rotation due to failure of chips or burrs to clear from the thread-creation region or, from bottoming in the hole. Generally, such chips or burrs will break off and clear the tap by a simple reversal of rotational direction of the tap in the hole. However, if the tap has been driven past its breaking point, this simple means of relief comes too late.

The present invention provides means to provide an upper limit for the drive torque to which the tap is exposed to reduce or eliminate the breakage of the taps resulting from overdrive conditions. The present invention can be used with a drill press or vertical mill, i.e., a free spindle device as opposed to a computer controlled machine. A drive collet assembly is provided including a collar element surrounding a substantial portion of the stem to stabilize the tap. A drive collet has a body portion with a recess to receive the collar element. The drive collet also has a smaller diameter aperture positioned above the recess to receive a portion of the stem which protrudes above the collar element. Two opposing, laterally extending bores are formed in the collet which intersect the smaller diameter aperture, the laterally extending bores being at least partially internally threaded.

Two rigid button elements are received, one each, in each of said two opposing, laterally extending apertures to engage opposing flat surfaces on the stem of said tap. Two flexible elements are received, one each, in each of the two opposing, laterally extending apertures and engaging an outwardly positioned surface of each of the two rigid button elements. Two set screws are received, one each, in each of said two opposing, laterally extending apertures engaging an outwardly positioned surface of each of the two flexible elements, each of the set screws being tightened to a predetermined level of rotational torque needed to establish a level of breakaway torque at which the collet will cease to drive the tap, that level of breakaway torque being under the maximum design torque for the tap. A stem portion extends from a face of said body portion opposite the collar-receiving recess, the stem portion being received in a power tool to rotate the collet and, thereby, the tap as it internally threads an opening. The two rigid button elements will be forced outwardly against the flexible elements when the breakaway torque is reached to prevent damage to the tap.

The two flexible elements are each made of an elastomer such as urethane with a hardness in the range of between 60 and 75 durometer. In addition, the rigid button elements are made of high speed steel with a hardness in the range of 68 to 70 R. C. A retention means, which can take the form of a spring clip that is received in an annular groove in the collet, is used to hold the collar in the collet. A set of drive collets is provided for a conventional set of taps to accommodate the different sized taps and eliminate the need to repeatedly assemble and disassemble the elements.

A method for setting the desired drive torque to achieve the desired breakaway torque is described in which the set screws are sequentially adjusted and the breakaway torque checked using a calibrated torque wrench until the desired setting is reached. After initial installation, markings can be placed on the drive collet and set screws to indicate the general region in which acceptable breakaway torque will be provided.

Other features, advantages and characteristics of the device of the present invention will become apparent after a reading of the following specification.

BRIEF DESCRIPTION OF THE DRAWINGS

The preferred embodiment(s) of the present invention are described in the following specification in conjunction with the drawings in which.

DETAILED DESCRIPTION OF THE PREFERRED EMBODIMENTS

Figure 2:
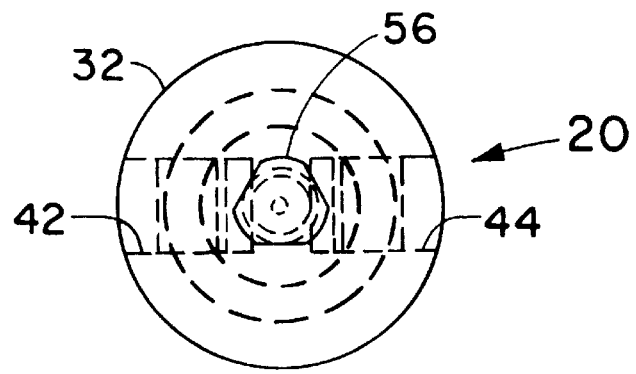
FIG. 2 is a top view of the first embodiment drive collet assembly of the present invention.
Figure 1:
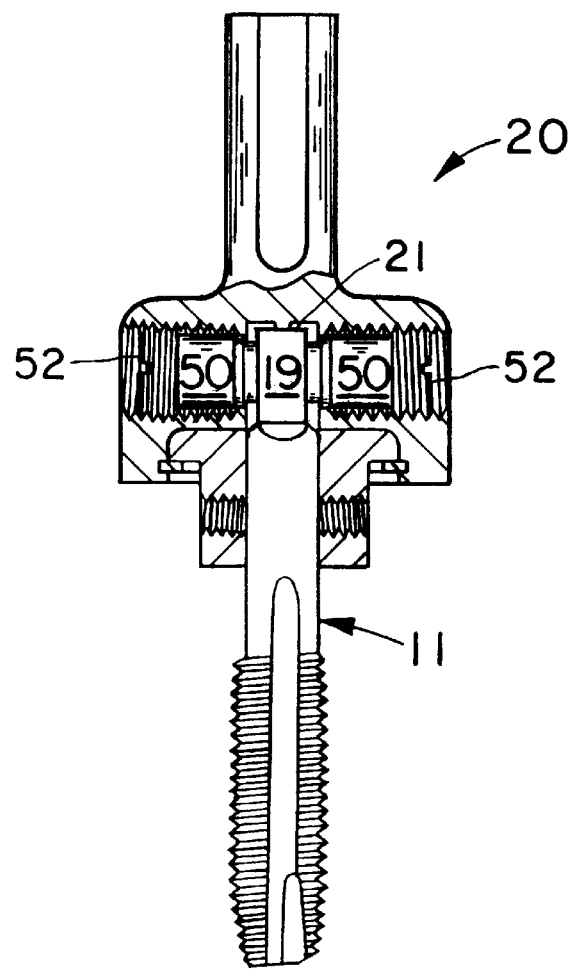
FIG. 1 is a cross-sectional side view of a first embodiment of the drive collet assembly of the present invention.
Figure 3:
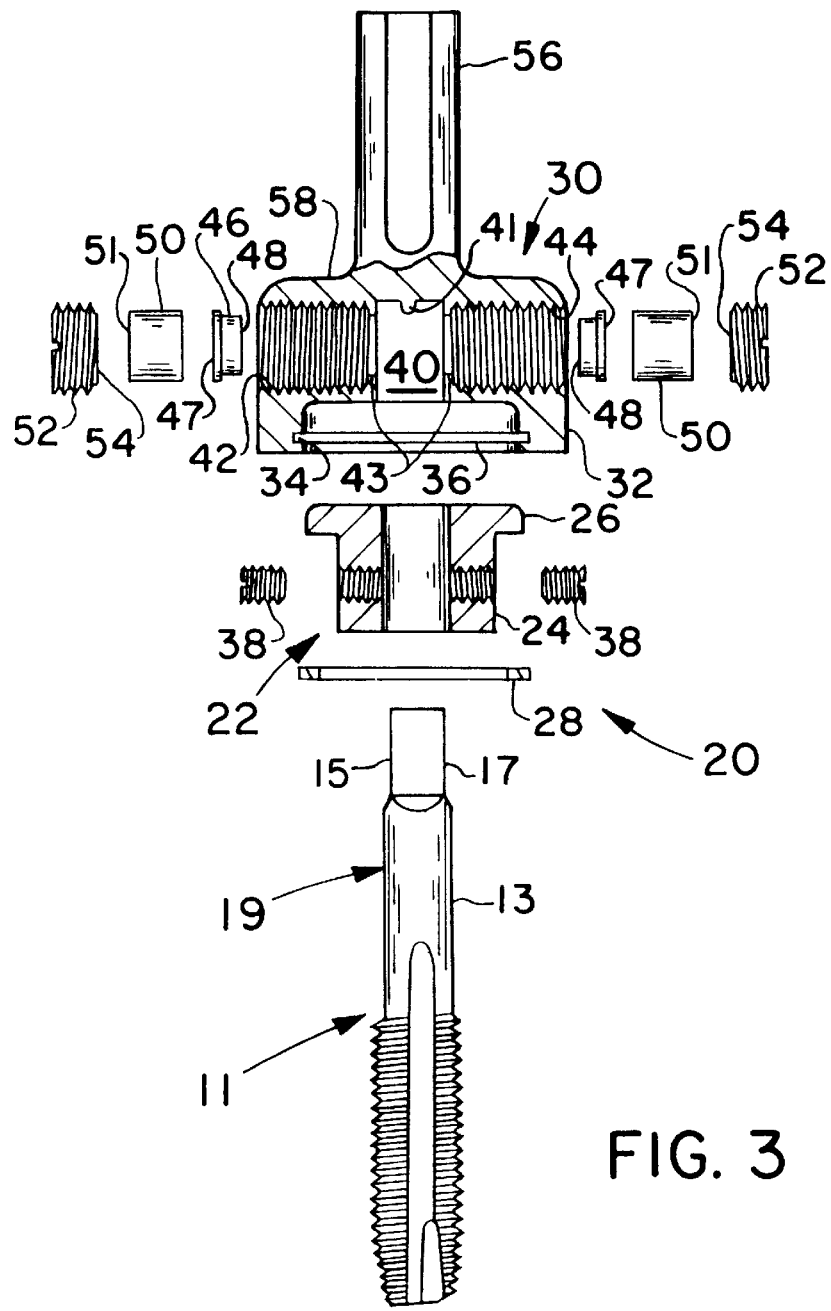
FIG. 3 is an exploded side view in partial section of the first embodiment of the drive collet of the present invention for a second size of tap.

The preferred embodiment of the drive collet assembly is shown in FIGS. 1–3 generally at 20. Drive collet assembly 20 includes a collar element 22 and a drive collet 30. Collar element 22 has a stem portion 24 and a flange 26 with a central aperture 27 extending through both. Drive collet 30 has a body portion 32 with a recess 34 that receives the flange 26 of collar element 22. An annular groove 36 is cut in recess 34 below the maximum extent of flange 26. Clip or spring clip 28 snaps into groove 36 to retain collar element 22 in drive collet 30. Set screws 38 are threaded into stem portion 24 of collar element 22 and engage outer periphery 13 of tap 11. Hence, spring, clip 28 provides axial retention force for both the collar element 22 and tap 11 but no drive torque since collar 22 is free to rotate relative to drive collet 30.

Tap 11 has a pair of opposed flat surfaces 15 and 17 on stem 19 (FIG. 3). An aperture 40 which has a diameter smaller than that of recess 34 is positioned above recess 34 and receives stem 19 of tap 11. A locator nub 41 extends from the rear end of aperture 40 and is received in a recess 21 in the end of tap 11 to center it in aperture 40 and prevent tap 11 from canting therein. Drive collet 30 has a pair of opposed laterally extending apertures 42, 44 that intersect the smaller diameter aperture 40. Apertures 42, 44 are at least partially threaded. Into each of these orifices 42, 44 is placed a rigid button 46 with a flat face 48 that engages its respective flat surface 15, 17; a flexible element 50 that engages an outwardly positioned flange 47 of button 46; and a set screw 52 with a surface 54 that engages an outwardly positioned surface 51 of flexible element 50. Set screws 52 will be adjusted to provide a desired level of breakaway torque that exceeds the tapping torque and is less than the twist off torque of the tap 11, i.e., the point at which the stem 19 will twist of the body of tap 11 should excessive torque due to a chip or burr or bottoming in the hole take place.

Rigid button 46 is preferably made of high speed steel having a hardness in the range of 68 to 70 R. C. Radially outwardly extending flange 47 will engage a radially inwardly extending shoulder 43 in each of the orifices 42 and 44 to limit the inward movement of buttons 46, i.e., buttons 46 will not be able to fall into aperture 40. Flexible elements 50 are preferably a medium hardness urethane with a hardness in the range of 60 to 75 durometer. It is conceivable that a natural or synthetic rubber might serve as a suitable material for the flexible elements, as well.

Stem portion 56 extends from face 58 which is opposite aperture 34. Stem portion 56 can be received in a power tool for rotation during tapping operations. Stem portion 56 has three flat faces so it may be received in the chuck of a drill. Alternatively, stem portion 56 may be received in an appropriately sized collet of a vertical mill, or the like.

Sleeve 60 can be threaded onto tap 11 for use in setting the drive torque for collet assembly 20. Table 1 depicts two torque settings for each of various sized taps: 1) the threshold torque at which tapping occurs and 2) the twist-off torque at which tap breakage occurs.

TABLE 1

| Tap Size | Threshold Torque | Twist-Off Torque |
| --- | --- | --- |
| 10/32 | 3 ft-lbs | 10 ft-lbs |
| ¼" | 7 ft-lbs | 15 ft-lbs |
| 5/16" | 10 ft-lbs | 25 ft-lbs |
| ⅜" | 20 ft-lbs | 40 ft-lbs |
| ½" | 30 ft-lbs | 65 ft-lbs |

To set the slip-torque mechanism to the appropriate setting, a calibrated socket wrench is inserted into the hex drive portion 62 of sleeve 60. By trial and error, set screws 52 are adjusted to a point where the breakaway torque for the tap 11 (as determined by the torque wrench) is greater than the threshold torque at which tapping takes places and less than the twist-off torque at which the tap breaks. It is preferred that the breakaway torque be set slightly above the tapping torque to provide a margin of error that protects the tap against breakage.

Once the initial positioning determination is made, marks can be etched on the surface of each body portion 32 to indicate the proper turn of the set screw 52 needed to provide the desired breakaway torque. A relatively minor adjustment in the set screw position results in a significant increase in torque. Hence, there will be only one orientation of the set screw slot that will bring surface 54 into engagement with surface 51 of flexible element 50 and not unduly compress it. Once proper adjustment is made, should tap 11 incur a high torque condition that would threaten to twist off stem 19, the overdrive torque setting will permit flats 15 and 17 of stem 19 to rotate relative to surfaces 48 of rigid buttons 46 since buttons 46 will be pushed outwardly, compressing flexible elements 50. By simply reversing the drive direction, the chips or burrs or contact with the bottom will be cleared and the tap maybe safely rotated out of the hole without risk of damage or breakage. When the tap 11 becomes worn, it may simply be replaced and the drive collet 20 can continue to be used. Should either the buttons 48 or the flexible elements 50 experience wear or a loss of resilience, they may be easily and inexpensively replaced. It will be understood that the sizes and numbers in the table are exemplary and not limiting and that the advantages of the present invention can be used with other sized taps, as well.

Various changes, alternatives, and modifications will become apparent to one of ordinary skill in the art after a reading of the foregoing specification. It is intended that all such changes, alternatives and modifications as fall within the scope of the appended claims be considered part of the present invention.

I claim:

1. A drive collet assembly for use with an internal-thread-producing tap, said tap having a thread-producing portion and a stem connected thereto with at least two flat surfaces, said drive collet assembly comprising:

a) a collar element surrounding a substantial portion of said stem to stabilize said tap;

b) a drive collet with a body portion having i) a recess to receive said collar element;

ii) a smaller diameter aperture positioned above said recess to receive a portion of said stem which extends above said collar element;

iii) at least two laterally extending bores which intersect said smaller diameter aperture, said laterally extending bores being, at least partially, internally threaded;

iv) at least two rigid button elements, one received in each of said at least two opposing, laterally extending apertures to engage said at least two flat surfaces on said stem of said tap;

v) at least two flexible elements, one received in each of said at least two opposing, laterally extending apertures engaging an outwardly positioned surface of each of said at least two rigid button elements;

vi) at least two set screws, one received in each of said two opposing, laterally extending apertures engaging an outwardly positioned surface of each of said at least two flexible elements, each of said set screws being tightened to a predetermined level of rotational torque needed to establish a level of breakaway torque at which said collet will cease to drive said tap;

c) a stem portion extending from a face of said body portion opposite said recess that receives said collar element, said stem portion being received in a power tool to rotate said collet and, thereby, said tap as it internally threads an opening;

whereby, said at least two rigid button elements will be forced outwardly against said flexible elements when said breakaway torque is reached to prevent damage to said tap.

2. The drive collet of claim 1 wherein said at least two flexible elements are each made of urethane with a hardness of between 60 and 75 durometer.

3. The drive collet of claim 1 wherein said rigid button elements are made of high speed steel with a hardness in the range of 68 to 70 R.C.

4. The drive collet of claim 1 further comprising retention means to hold said collar element in said body portion of said drive collet.

5. The drive collet of claim 4 wherein said retention means comprises a spring clip which is received in an annular groove in said body portion of said drive collet.

6. The drive collet of claim 1 further comprising means to set the breakaway torque at a value greater than the threshold tapping torque and less than the twist-off torque for said tap.

7. The drive collet of claim 1 wherein said collet comprises a member of a set of such collets used with a range of diameters of taps.

8. A set of internal-thread producing taps for threading a plurality of different sized apertures, each tap in said set comprising:

a) a generally cylindrical tap body having a thread-producing portion and a stem connected thereto with at least two flat surfaces;

b) a collar element surrounding a substantial portion of said stem to stabilize said tap;

c) a drive collet with a body portion having i) a recess to receive said collar element;

ii) a smaller diameter aperture positioned above said recess to receive a portion of said stem which extends above said collar element;

iii) at least two, laterally extending bores which intersect said smaller diameter aperture, said laterally extending bores being internally threaded;

iv) at least two rigid button elements, one received in each of said at least two opposing, laterally extending apertures to engage said at least two flat surfaces on said stem of said tap, v) at least two flexible elements, one received in each of said at least two opposing, laterally extending apertures engaging an outwardly positioned surface of each of said at least two rigid button elements;

vi) at least two set screws, one received in each of said at least two opposing, laterally extending apertures engaging an outwardly positioned surface of each of said at least two flexible elements, each of said set screws being tightened to a predetermined level of rotational torque needed to establish a level of breakaway torque at which said collet will cease to drive said tap;

d) a stem portion extending from a face of said body portion opposite said recess that receives said collar element, said stem portion being received in a power tool to rotate said collet and, thereby, said tap as it internally threads an opening;

whereby, said at least two rigid button elements will be forced outwardly against said flexible elements when said breakaway torque is reached to prevent damage to each said tap.

9. The drive collet of claim 8 wherein said at least two flexible elements are each made of urethane with a hardness of between 60 and 75 durometer.

10. The drive collet of claim 8 wherein said rigid button elements are made of high speed steel with a hardness in the range of 68 to 70 R. C.

11. The drive collet of claim 8 further comprising retention means to hold said collar element in said body portion of said drive collet.

12. The drive collet of claim 11 wherein said retention means comprises a spring clip which is received in an annular groove in said body portion of said drive collet.

13. The drive collet of claim 8 further comprising means to set the breakaway torque at a value greater than the threshold tapping torque and less than the twist-off torque for said tap.

* * * * *